(12) United States Patent
Burns (10) Patent No.: US 7,536,345 B1
(45) Date of Patent: *May 19, 2009

(54) METHOD AND SYSTEM FOR QUANTITY ENTRY

(75) Inventor: Michael Burns, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 45 days.

This patent is subject to a terminal disclaimer.

(21) Appl. No.: 11/417,885

(22) Filed: May 3, 2006

Related U.S. Application Data (63) Continuation of application No. 10/284,884, filed on Oct. 31, 2002.

(51) Int. Cl.
*G06Q 40/00* (2006.01)
(52) U.S. Cl. ....................................................... 705/37
(58) Field of Classification Search .................... 705/37
See application file for complete search history.

(56) References Cited

U.S. PATENT DOCUMENTS

| | | | |
|---|---|---|---|
| 4,674,044 A | 6/1987 | Kalmus | |
| 4,903,201 A | 2/1990 | Wagner | |
| 5,038,284 A | 8/1991 | Kramer | |
| 5,077,665 A | 12/1991 | Silverman et al. | |
| 5,101,353 A | 3/1992 | Lupien | |
| 5,136,501 A | 8/1992 | Silverman | |
| 5,270,922 A | 12/1993 | Higgins | |
| 5,297,031 A | 3/1994 | Gutterman | |
| 5,297,032 A | 3/1994 | Trojan | |
| 5,689,651 A | 11/1997 | Lozman | |
| 5,774,877 A | 6/1998 | Patterson | |
| 5,793,301 A | 8/1998 | Patterson | |
| 5,797,002 A | 8/1998 | Patterson | |
| 5,845,266 A | 12/1998 | Lupien | |
| 5,915,245 A | 6/1999 | Patterson | |
| 5,924,082 A | 7/1999 | Silverman | |

(Continued)

FOREIGN PATENT DOCUMENTS

EP 1067471 A1 1/2001

(Continued)

OTHER PUBLICATIONS

GL Trade User Guide V4.60 Jun. 1999.*

(Continued)

*Primary Examiner*—James A Kramer
*Assistant Examiner*—Jessica L Lemieux
(74) *Attorney, Agent, or Firm*—McDonnell Boehnen Hulbert & Berghoff LLP (57) ABSTRACT

A trading screen may include a plurality of next trade quantity regions that comprise a plurality of locations, each location being associated a price on a price axis. The quantities can be entered into the various locations in the next trade quantity regions and the entered quantities can be used as a parameter of a future trade order at the associated price level. The trading screen may also include a plurality of quantity entry regions that are displayed with respect to the price axis. The quantity entry columns may each include plurality of sub-regions or locations corresponding to different price levels in the price axis. The quantity entry columns may be used to specify next traded quantities that may be used in placing orders for tradeable objects.

23 Claims, 8 Drawing Sheets

| 128 | 124 | 122 | 120 | 118 | 126 | 104 | 100 | 102 | 116 | 106 | 108 | 110 | 112 | 114 |
|---|---|---|---|---|---|---|---|---|---|---|---|---|---|---|
| Default | 20 | 10 | 5 | 1 | NTQ | Bid | Price | Ask | NTQ | 1 | 5 | 10 | 20 | |
| 0 | | | | | | | 65 | | | | | | | |
| 0 | | | | | | | 60 | 78 | | | | | | |
| 0 | | | | | | | 55 | 2 | 28 | | | | | |
| 1 5 | | | | | | | 50 | 142 | | | | | | |
| 10 20 | | | | | | | 45 | 56 | 15 | | | | | |
| 50 100 | | | | | | | 40 | 12 | 19 | | | | | |
| clr | | | | | | 5 | 35 | | | | | | | |
| 0 | | | | | | 17 | 102 | 30 | | | | | | |
| SL SM | | | | | | 4 | 39 | 25 | | | | | | |
| | | | | | | | 16 | 20 | | | | | | |
| Delete All | | | | | | 23 | 7 | 15 | | | | | | |
| Delete 0 | | | | | | | | 10 | | | | | | |
| Delete 0 | | | | | | | | | | | | | | |

U.S. PATENT DOCUMENTS

| | | | |
|---|---|---|---|
| 5,924,083 | A | 7/1999 | Silverman |
| 5,946,667 | A | 8/1999 | Tull |
| 5,963,923 | A | 10/1999 | Garber |
| 6,012,046 | A | 1/2000 | Lupien |
| 6,014,643 | A * | 1/2000 | Minton ............... 705/36 R |
| 6,035,287 | A | 3/2000 | Stallaert |
| 6,098,051 | A | 8/2000 | Lupien |
| 6,131,087 | A | 10/2000 | Luke |
| 6,134,535 | A | 10/2000 | Belzberg |
| 6,195,647 | B1 | 2/2001 | Martyn |
| 6,272,474 | B1 | 8/2001 | Garcia |
| 6,278,982 | B1 | 8/2001 | Korhammer |
| 6,282,521 | B1 | 8/2001 | Howorka |
| 6,408,282 | B1 * | 6/2002 | Buist ............... 705/36 R |
| 6,766,304 | B2 * | 7/2004 | Kemp et al. ......... 705/36 R |
| 7,181,425 | B1 * | 2/2007 | Cha ................... 705/37 |
| 4,751,035 | A1 | 2/2008 | Boilen |
| 2002/0023038 | A1 | 2/2002 | Fritsch |
| 2002/0035534 | A1 | 3/2002 | Buist |
| 2002/0055899 | A1 | 5/2002 | Williams |
| 2002/0059129 | A1 | 5/2002 | Kemp |
| 2002/0099644 | A1 | 7/2002 | Kemp |
| 2002/0120551 | A1 | 8/2002 | Jones |
| 2002/0138401 | A1 | 9/2002 | Allen |
| 2003/0004853 | A1 | 1/2003 | Ram |
| 2003/0009411 | A1 | 1/2003 | Ram |
| 2003/0023542 | A1 | 1/2003 | Kemp |

FOREIGN PATENT DOCUMENTS

| | | |
|---|---|---|
| WO | WO9114231 A1 | 9/1991 |
| WO | WO95/26005 A1 | 9/1995 |
| WO | WO9849639 A1 | 11/1998 |
| WO | WO9919821 A1 | 4/1999 |
| WO | WO99/30259 A1 | 6/1999 |
| WO | WO9953424 A1 | 10/1999 |
| WO | WO00/52619 A1 | 9/2000 |
| WO | WO00/62187 A2 | 10/2000 |
| WO | WO00/62187 A3 | 10/2000 |
| WO | WO00/65510 A1 | 11/2000 |
| WO | WO01/16830 A1 | 3/2001 |
| WO | WO01/16852 A2 | 3/2001 |
| WO | WO01/22315 A2 | 3/2001 |
| WO | WO0165403 A2 | 9/2001 |
| WO | WO01/88808 A1 | 11/2001 |
| WO | WO02/15461 A2 | 2/2002 |
| WO | WO0229686 A1 | 4/2002 |
| WO | WO01/16852 C1 | 6/2002 |
| WO | WO02/48945 A1 | 6/2002 |
| WO | WO02/059815 A1 | 8/2002 |
| WO | WO02/069226 A2 | 9/2002 |
| WO | WO02/079940 A2 | 10/2002 |
| WO | WO02/093325 A2 | 11/2002 |
| WO | WO03090032 A2 | 10/2003 |
| WO | WO03090032 A3 | 10/2003 |

OTHER PUBLICATIONS

USPTO Presentation, NASDAQ, Nov. 8, 2001.

Kharouf, A Trading Room with a View, Futures, 27, 11—Nov. 1998.

www.tradingtechnologies.com/products/xtrade_full.html (viewed May 22, 2001) Jun. 9, 2000.

GLTrade, User Guide V4.60 Liffe Connect for Futures, Jun. 1999, London, United Kingdom.

* cited by examiner

| 20 | 10 | 5 | 1 | NTQ | Bid | Price | Ask | NTQ | 1 | 5 | 10 | 20 |
|----|----|---|---|-----|-----|-------|-----|-----|---|---|----|----|
|    |    |   |   |     |     | 65    | 78  |     |   |   |    |    |
|    |    |   |   |     |     | 60    | 2   | 28  |   |   |    |    |
|    |    |   |   |     |     | 55    | 142 |     |   |   |    |    |
|    |    |   |   |     |     | 50    | 56  | 15  |   |   |    |    |
|    |    |   |   |     | 5   | 45    | 12  | 19  |   |   |    |    |
|    |    |   |   | 17  | 102 | 40    |     |     |   |   |    |    |
|    |    |   |   | 4   | 39  | 35    |     |     |   |   |    |    |
|    |    |   |   |     | 16  | 30    |     |     |   |   |    |    |
|    |    |   |   | 23  | 7   | 25    |     |     |   |   |    |    |
|    |    |   |   |     |     | 20    |     |     |   |   |    |    |
|    |    |   |   |     |     | 15    |     |     |   |   |    |    |
|    |    |   |   |     |     | 10    |     |     |   |   |    |    |

| Default |     |
|---------|-----|
| 0       |     |
| 0       |     |
| 0       |     |
| 1       | 5   |
| 10      | 20  |
| 50      | 100 |
| clr     |     |
| 0       |     |
| SL      | SM  |
| Delete All |  |
| Delete 0 |    |
| Delete 0 |    |

| | 20 | 10 | 5 | 1 | NTQ | Bid | Price | Ask | NTQ | 1 | 5 | 10 | 20 |
|---|---|---|---|---|---|---|---|---|---|---|---|---|---|
| | | | | | | | 65 | | | | | | |
| | | | | | | | 60 | 78 | | | | | |
| | | | | | | | 55 | 2 | | | | | |
| | | | | | | | 50 | 142 | | | | | |
| | | | | | | | 45 | 56 | | | | | |
| | | | | | | | 40 | 12 | | | | | |
| | | | | | | 5 | 35 | | | | | | |
| | | | | | | 102 | 30 | | | | | | |
| | | | | | | 39 | 25 | | | | | | |
| | | | | | | 16 | 20 | | | | | | |
| | | | | | | 7 | 15 | | | | | | |
| | | | | | | | 10 | | | | | | |

| Default | |
|---|---|
| 0 | |
| 0 | |
| 0 | |
| 1 | 5 |
| 10 | 20 |
| 50 | 100 |
| clr | |
| 0 | |
| SL | SM |
| Delete All | |
| Delete 0 | |
| Delete 0 | |

| | 20 | 10 | 5 | 1 | NTQ | Ask | Price | Bid | NTQ | 1 | 5 | 10 | 20 |
|---|---|---|---|---|---|---|---|---|---|---|---|---|---|
| | | | | | | | 65 | | | | | | |
| | | | | | | 78 | 60 | | | | | | |
| | | | | | | 2 | 55 | | | | | | |
| | | | | | | 142 | 50 | | | | | | |
| | | | | | | 56 | 45 | | | | | | |
| | | | | | | 12 | 40 | | | | | | |
| | | | | | | | 35 | 5 | | | | | |
| | | | | | | | 30 | 102 | 10 | | | | |
| | | | | | | | 25 | 39 | | | | | |
| | | | | | | | 20 | 16 | | | | | |
| | | | | | | | 15 | 7 | | | | | |
| | | | | | | | 10 | | | | | | |

| Default | | |
|---|---|---|
| 0 | | |
| 0 | | |
| 0 | | |
| 1 | | 5 |
| 10 | | 20 |
| 50 | | 100 |
| clr | | |
| 0 | | |
| SL | | SM |
| Delete All | | |
| Delete | | 0 |
| Delete | | 0 |

FIG. 3B

| | 20 | 10 | 5 | 1 | NTQ | Bid | Price | Ask | NTQ | 1 | 5 | 10 | 20 | |
|---|---|---|---|---|---|---|---|---|---|---|---|---|---|---|
| | | | | | | | 65 | | | | | | | |
| | | | | | | | 60 | 78 | | | | | | |
| | | | | | | | 55 | 2 | | | | | | |
| | | | | | 5 | 50 | 142 | | | | | | | |
| | | | | | | 102 | 45 | 56 | | | | | | |
| | | | | 15 | | 39 | 40 | 12 | | | | | | |
| | | | | | | 16 | 35 | | | | | | | |
| | | | | | | | 30 | | | | | | | |
| | | | | | 7 | 25 | | | | | | | | |
| | | | | | | | 20 | | | | | | | |
| | | | | | | | 15 | | | | | | | |
| | | | | | | | 10 | | | | | | | |

↖ 304

| Default | | |
|---|---|---|
| 0 | | |
| 0 | | |
| 0 | | |
| 1 | 5 | |
| 10 | 20 | |
| 50 | 100 | |
| clr | | |
| SL | 0 | SM |
| Delete All | | |
| Delete 0 | | |
| Delete 0 | | |

| 124 | 122 | 120 | 118 | 126 | 104 | 100 | 102 | 116 | 106 | 108 | 110 | 112 | 114 |
|---|---|---|---|---|---|---|---|---|---|---|---|---|---|
| 20 | 10 | 5 | 1 | NTQ | Bid | Price | Ask | NTQ | 1 | 5 | 10 | 20 | |
| | | | | | | 65 | | | | | | | |
| | | | | | | 60 | 78 | | | | | | |
| | | | | | | 55 | 2 | | | | | | |
| | | | | | | 50 | 142 | | | | | | |
| | | | | | | 45 | 56 | | | | | | |
| | | | | | | 40 | 12 | | | | | | |
| | | | | | 5 | 35 | | | | | | | |
| | | | | 17 | 102 | 30 | | | | | | | |
| | | | | | 39 | 25 | | | | | | | |
| | | | | | 16 | 20 | | | | | | | |
| | | | | | 7 | 15 | | | | | | | |
| | | | | | | 10 | | | | | | | |

| Default | | |
|---|---|---|
| 0 | | |
| 0 | | |
| 0 | | |
| 1 | 5 | |
| 10 | 20 | |
| 50 | 100 | |
| clr | | |
| 0 | | |
| SL | SM | |
| Delete All | | |
| Delete 0 | | |
| Delete 0 | | |

METHOD AND SYSTEM FOR QUANTITY ENTRY

CROSS REFERENCE TO RELATED APPLICATION

This application is a continuation of U.S. patent application Ser. No. 10/284,884 filed Oct. 31, 2002, entitled "Method and System for Quantity Entry" the contents of which are fully incorporated herein by reference.

FIELD OF THE INVENTION

The present invention relates generally to electronic trading. More specifically, it relates to processing trading information.

BACKGROUND OF THE INVENTION

Many exchanges throughout the world now support electronic trading. Generally, an electronic exchange provides a matching process between traders, or simply buyers and sellers. Some well known exchanges include Eurex, London International Financial Futures Exchange ("LIFFE"), Euronext, Chicago Mercantile Exchange ("CME"), Chicago Board of Trade ("CBOT"), Xetra, and Island. Traders are typically connected to an electronic exchange by way of a communication link to facilitate electronic messaging between the trader and the exchange. For instance, the trader might submit buy or sell orders to an electronic exchange and later obtain status or fill information from the exchange. Among other things, ease of submitting buy or sell orders has made electronic exchanges a successful venue for trading. Accordingly, an increasing number of people across the world are actively participating in a market at any given time. The increase in the number of potential market participants has advantageously led to, among other things, a more competitive market and greater liquidity.

A trader can connect to an exchange, for example, using a client device, and the exchange can serve as a host. Once connected, software running on the client allows the trader to log onto one or more exchanges and participate in one or more markets. Some clients run software that creates specialized interactive trading screens. In general, the trading screens enable traders to enter orders into the market, obtain market quotes, and monitor positions. The range and quality of features available varies according to the specific trading application.

Using the trading application, a trader may place orders within the markets supported by the exchange. In placing an order, the trader typically specifies a price and a quantity for the order. Some trading application programs, however, allow a trader to pre-configure the trading application with a default order quantity. Then, the trader may place an order by simply selecting a price level, and the trading application automatically uses the default order quantity without requiring the trader to enter a quantity for that order.

The trader, however, may wish to place successive orders for varying quantities. In that case, the trader may have to manually clear the default quantity, enter a different quantity for the order and then place the order. For successive orders, this can be a time consuming process, and it can limit the speed with which the trader can place the orders.

In the following detailed description, a trading application and trading interface for order quantity entry are described. These tools provide advantages, as described below, to a trader in an electronic trading environment.

BRIEF DESCRIPTION OF THE DRAWINGS

The presently preferred embodiments of the present invention are described herein with reference to the drawings, in which.

DETAILED DESCRIPTION OF THE PRESENTLY PREFERRED EMBODIMENTS

Many different exchanges support electronic trading. Electronic trading allows a trader to interact with the exchanges from a remote location, such as by using a computer connected to the exchanges over one or more computer networks. Once connected to an exchange, the trader may receive market information about tradeable objects that are traded on the exchange. The trader may additionally trade the tradeable objects, such as by entering buy or sell orders.

A tradeable object can be any object, such as stocks, options, bonds, futures, currency, warrants, funds, or other financial objects. Other objects, for example, grains, energy and metals can also be traded. Of course, these list are not exhaustive, and any other object for which there exists a market can be traded. Tradeable objects can be "real," such as products that are listed by an exchange for trading, or they can by "synthetic," such as a combination of real products that is created by a trader. Of course, a tradeable object could actually be a combination of other tradeable objects, such as a class of tradeable objects.

Electronic trading exchanges are generally based on one or more hosts, one or more computer networks, and a plurality of clients. In general, the host includes one or more centralized computers. Its operations may include order matching, maintaining order books and positions, price information, and managing and updating, for example a database, that records such information. The host may also be equipped with an external interface that maintains uninterrupted contact to the clients and possibly other trading-related systems.

Market participants may link to the host through one or more networks. A network is a group of two or more computers linked together. There are many types of networks such as local area networks and wide area networks. Networks can also be characterized by topology, protocol, and architecture. However, any type of network configuration can be used in electronic trading. For example, some market participants may link to the host through a direct connection such as a T1 line or an Integrated Digital Services Network ("ISDN") connection. When connecting through a direct connection, a market participant may connect through one or more common network components such as high-speed servers, routers, and gateways, and so on. Of course, a market participant may also connect to the exchange through the Internet or another type of network.

A method, system and interface for electronic trading with an exchange is described in U.S. patent application Ser. No. 09/590,692, filed Jun. 9, 2000, entitled "Click Based Trading with Intuitive Grid Display of Market," and is also described in U.S. patent application Ser. No. 09/589,751, filed Jun. 9, 2000, entitled "Clicked Based Trading with Market Depth Display." Both applications are commonly assigned to Trading Technologies International, Inc., and the contents of both applications are incorporated herein by reference. These applications describe network topologies, interfaces and general trading functionality and techniques that may be used in implementing the preferred embodiments described herein.

Once connected to an exchange, a trading application may use trading screens to enable a trader to interact with one or more markets. Trading screens may enable traders to enter and cancel orders, obtain market information, and monitor positions while implementing various trading strategies including those previously used on the floor of an exchange. For example, using the trading screen a trader may receive information about tradeable objects traded on the exchange. Additionally, the trader may use the trading screen, for example, to place buy and sell orders for the tradeable objects or to otherwise trade the tradeable objects.

While a trader may connect electronically to an exchange, it is not necessary that the entire trading process occur electronically. For example, preferred embodiments may utilize an electronic trading application that sends orders electronically to a terminal where a person (e.g., a floor broker) executes those orders in a traditional open outcry trading floor. Of course, other variations are also possible.

The trading application may receive information from the exchange, which can in turn be displayed to the trader via a trading screen. For example, the trading application may receive a list of tradeable objects traded on the exchange. Additionally, the trading application may receive market information for each tradeable object, such as bid prices, bid quantities, ask prices, ask quantities, and additionally, some exchanges provides prices and quantities for past sales, and other market related information. The information may be continuously or regularly provided to the trading application, which allows the trading application to update the trading screen with current market information.

Using the market information displayed by the trading application, the trader may trade the market. The trader may place orders for different tradeable objects, and the orders may be at different price levels and for different quantities. The trader may place an order, for example, by selecting a price level and a quantity. This may be done in a variety of different ways, which may vary with the particular trading application used by the trader. For example, the trader may manually enter a quantity into the trading screen, and then the trader may select buy or sell option for a particular price level.

In order to aid the trader in placing orders, the trading application may allow the trader to specify a default order quantity. Then, the trader may place an order by selecting a buy or sell option at a particular price level, and the trading application may use the default order quantity previously defined by the trader as the quantity for the order. By specifying a default order quantity, the trading application may support "click" trading. For a trading application that supports click trading, the trader may place an order simply by clicking a bid or ask option for a particular price level. The trading application may then place the order at the specified price level using the default order quantity previously specified by the trader. As the trader does not have to enter a quantity each time the trader places an order, click-based trading may allow the trader to place orders more quickly.

However, the trader may want to place orders having different quantities. The trader may do this in a variety of different ways. For example, the trader may specify a new default order quantity, such as by manually reconfiguring the default order quantity to a new value. This, however, can be a time consuming process and may not be efficient when the trader places successive orders at different price levels. In another example, the trader may override the default order quantity and manually specify a quantity to be used for the trader's next order. This may be done, for instance, by first clearing the default value and then typing a new quantity to be used into the trading screen. This too, however, may be a time consuming process that is inefficient when the trader places successive order for varying quantities.

In a preferred embodiment, the trading screen may include one or more quantity entry columns, which may be used in place of a default value to specify quantities for orders. For example, the trading screen may include one or more bid quantity entry columns, and the trading screen may also include one or more ask quantity entry columns. The quantity entry columns may each correspond to a specify order quantity, and the quantities of the various bid and ask quantity entry columns may be different. The bid and ask quantity entry columns may each have multiple cells, which each correspond to a particular price level. The trader may then place an order by selecting one or more cells in the quantity entry columns at a particular price level. The quantity of the order placed by the trader may then be based on the corresponding quantities of the chosen quantity entry columns. Thus, the trader may select a quantity using one of the quantity entry columns, or the trader may sum values using multiple quantity entry columns in order to specify the total quantity for an order.

Figure 1:
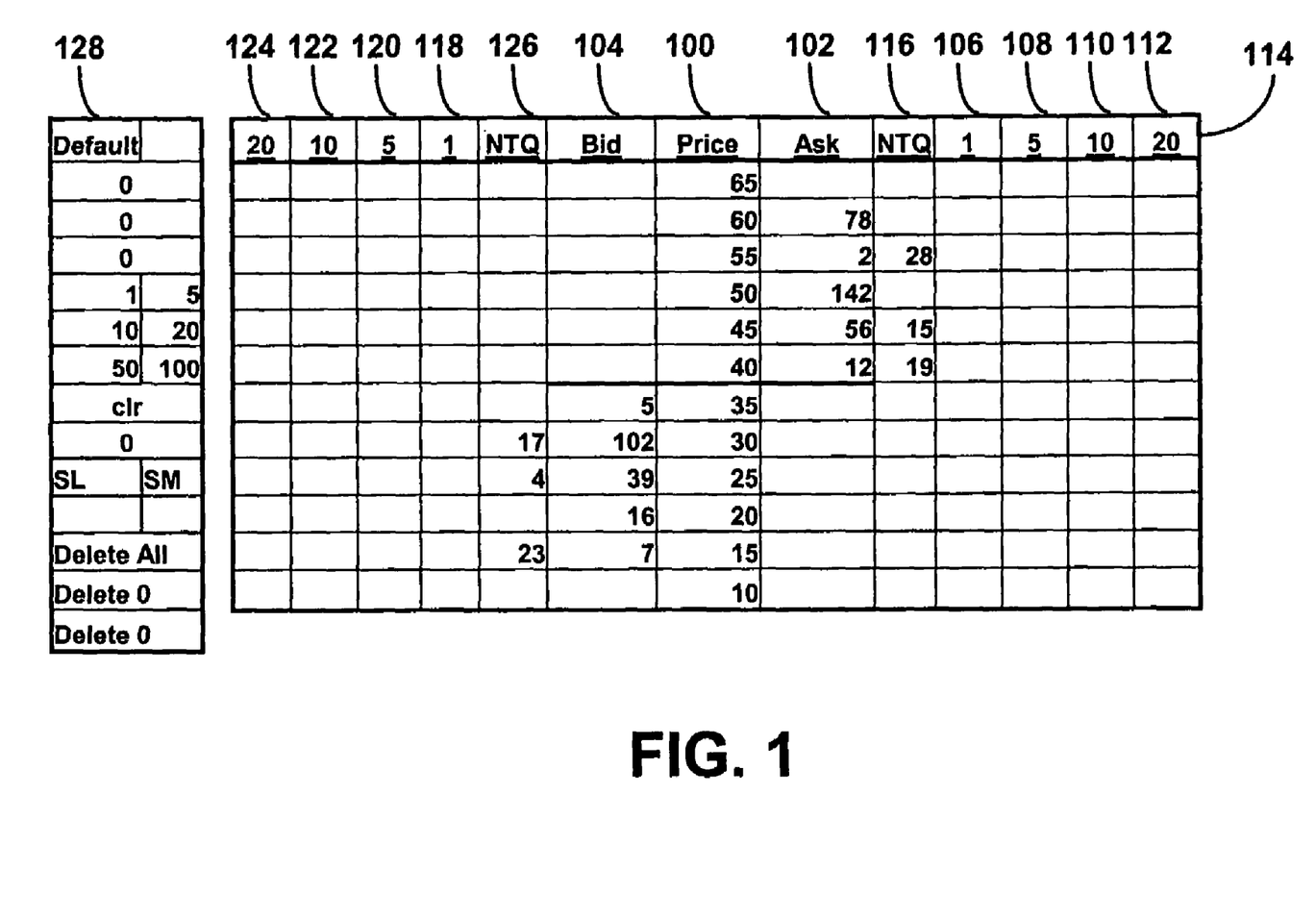
FIG. 1 is a preferred embodiment of a trading screen for order entry using order quantity columns.

FIG. 1 is a preferred embodiment of a trading screen for order entry using order quantity columns. As depicted in FIG. 1, the trading screen includes a price column 100. The price column 100 displays various different price levels for a tradeable object. The trading screen also includes an ask quantity column 102 and a bid quantity column 104. The ask quantity column 102 displays current ask quantities at various different price levels. The bid quantity column 104 displays current bid quantities at various different price levels. Thus, the ask quantity column 102 and the bid quantity column 104 can display current market depth. The bid and ask quantities in the bid and ask quantity columns 102, 104 may be displayed using any type of indicator. For example, the indicator may be graphical representation of quantity (e.g., colors, bars, etc. . . . ), or the indicator may be a textual representation of quantity, such as a number. Various combinations of indicators may also be used, for example, a text representation in combination with a color.

As depicted in FIG. 1, the outstanding bid quantities and ask quantities are displayed in association with price levels arranged along a common static axis or scale of prices. The price levels are fixed in relation to the bid and ask quantity columns 102, 104, such that the indicators in these columns 102, 104 may move relative to the static axis of prices. For example, the bid and ask quantities displayed by the trading screen may change, and the inside market may move away from the price level depicted in FIG. 1. The inside market generally refers to the separation between the lowest ask price and the highest bid price. While the trading application may update the quantities, and while the position of the inside market may change, the range of price levels displayed in the price column 100 and the respective positions of the price levels displayed in the price column 100 may remain fixed.

It should be noted that the static axis of prices is not necessarily immovable with respect its physical position on the display screen, but rather may be moved to various different positions on the display. The user may use a mouse or other input device, for example, to reposition static axis of prices to a different location on the display screen, such as by dragging the static axis of prices from one side of the display screen to the other side of the display screen. In another example, the user may vary which portion of the static axis of prices is displayed, such as by scrolling up or down the axis or by entering a repositioning or re-centering command. Repositioning and re-centering are described in more detail in U.S. patent application Ser. No. 10/125,894 filed on Apr. 19, 2002, entitled "Trading Tools for Electronic Trading," which is commonly assigned to Trading Technologies International, Inc., and the contents of which are incorporated herein by reference. They are also described in more detail in the previously referenced application Ser. No. 09/590,692, titled "Click Based Trading with Intuitive Grid Display of Market."

One commercially available trading application that allows a user to trade in an electronic trading environment, and which may be used in the preferred embodiments, is X_TRADER® from Trading Technologies International, Inc. of Chicago, Ill. X_TRADER® X_TRADER® also provides an electronic trading interface, referred to as MD Trader™, in which working orders and/or bid and ask quantities are displayed in association with a static price axis or scale.

Portions of the X_TRADER® and the MD Trader™-style display are described in the previously referenced applications, and they are also described in U.S. patent application Ser. No. 09/971,087, entitled "Click Based Trading With Intuitive Grid Display Of Market Depth And Price Consolidation," filed on Oct. 5, 2001, which is commonly assigned to Trading Technologies International, Inc., and which is incorporated herein by reference in its entirety. Moreover, the trading application may implement tools for trading tradeable objects that are described in the previous referenced application Ser. No. 10/125/894, titled "Trading Tools for Electronic Trading."

The trading screen may also include a variety of other regions, which may be used to display other information to a trader. As shown in FIG. 1, the trading screen additionally may include a first ask quantity entry region 106, a second ask quantity entry region 108, a third ask quantity entry region 110 and a fourth ask quantity entry region 112. In this example, these regions are shown as columns, but the invention is not limited to any particular orientation of the display. As shown in FIG. 1, each of the ask quantity entry regions 106, 108, 110, 112 corresponds to a particular order quantity, which is indicated in an identifier row 114. The first quantity entry region 106 corresponds to a quantity of "1", the second quantity entry region 108 corresponds to a quantity of "5", the third quantity entry region 100 corresponds to a quantity of "10", and the fourth quantity entry region 112 corresponds to a quantity of "20." Each of the ask quantity entry regions includes a plurality of locations, where each location preferably corresponds to a price level on the price axis 100. In this example, each location is a cell of the column.

An ask next traded quantity ("NTQ") region 116 may display next traded ask quantities for one or more of the price levels. The next traded quantity in this column may represent the quantity used for the next ask orders placed at one or more of the price levels. As shown in FIG. 1, the ask NTQ column 116 displays a NTQ of "28" at the "55" price level, an NTQ of "15" at the "45" price level, and an NTQ of "19" at the "40" price level. Of course, these values are merely examples, and they may vary based on the inputs to the trading screen. Other NTQs may be displayed at these or other price levels. Additionally, a greater or fewer number of NTQ may be displayed. While ask quantity entry regions 106, 108, 110, 112 may be used to place sell orders, bid quantity entry regions may be used to place buy orders. As shown in FIG. 1, the trading screen may include a first bid quantity entry region 118, a second bid quantity entry region 120, a third bid quantity entry region 122 and a fourth bid quantity entry region 124. Each of the bid quantity entry regions 118, 120, 122, 124 corresponds to a respective quantity. The first bid quantity entry region 118 corresponds to a quantity of "1", the second bid quantity entry region 120 corresponds to a quantity of "5", the third bid quantity entry region 122 corresponds to a quantity of "10", and the fourth bid quantity entry region 124 corresponds to a quantity of "20". The corresponding quantities for the bid quantity entry regions 118, 120, 122, 124 are displayed in the identifier row 114. Like the ask quantity entry regions, each of the bid quantity entry regions preferably includes a plurality of locations (e.g., cells) each of which corresponds to a price level on the price axis 100. It should be understood that the bid and ask quantity regions are shown by way of example, and as will be described later, they may be reconfigured, such as by changing the number of regions, the arrangement of the regions or the quantities associated with the regions.

A bid NTQ region 126 may display next traded bid quantities for various price levels. The next traded bid quantities may represent the quantities used for the next bid orders placed at the various price levels. As shown in FIG. 1, the bid NTQ region 126 displays NTQs for various different price levels. An NTQ quantity of "17" is displayed at the "30" price level, an NTQ quantity of "4" is displayed at the "25" price level, and an NTQ quantity of "23" is displayed at the "15" price level. These values are merely examples, and the actual values displayed may vary based on inputs to the trading screen.

FIG. 1 also depicts an optional default quantity entry window 128. The default quantity entry window 128 may be used, for example, to specify a default quantity that may be used when placing orders at the various different price levels. In addition to specifying a default quantity, the default quantity entry window 128 may be used to specify quantities other than the default quantity to be used when placing orders. Thus, the default quantity entry window 128 may be used to override the default value for particular orders. A trading application may use the default quantity entry window 128 in conjunction with the quantity entry regions 106, 108, 110, 112, 118, 120, 122, 124, or the trading application may optionally not use the default quantity entry window 128.

In an alternative embodiment, no ask or bid quantity entry regions are displayed. In this embodiment, at least one NTQ region with locations corresponding to different price levels is displayed. Locations in the NTQ region can be seeded by entering numbers directly into the locations using any input method. For example, a trader can input quantities by using a conventional keyboard. Alternatively, different buttons or keys on an input device can be assigned quantity values and the application can be programmed to add a quantity to or subtract a quantity from a location in the NTQ region in response to a trader depressing the buttons or keys. In addition, the invention is not limited to the entry of numbers in the NTQ region. For example, a formula can be input into a location that dynamically calculates a number based on various inputs. Also, a location in the NTQ region may be linked to a third party application, such as a spreadsheet, which provides numbers to be input into that location. One example would be to calculate a particular NTQ value based on fill information and to input that number into a particular NTQ location based on a theoretical price. As one of ordinary skill in the art will appreciate, there are many different manners to calculate NTQ numbers and the invention is not limited to any particular approach, strategy or algorithm.

Many different changes may be made to the trading screen depicted in FIG. 1. In one alternate embodiment, the trading screen may use a greater or fewer number of ask quantity entry regions. In another alternate embodiment, the trading screen may use a greater or fewer number of bid quantity entry regions. Other embodiments may use a different number of ask quantity entry regions than bid quantity entry regions. In yet another alternate embodiment, the trading screen may include ask quantity entry regions but not bid quantity entry regions, or the trading screen may include bid quantity entry regions but not ask quantity entry regions.

In another alternate embodiment, the quantity entry regions may correspond to different quantities, and the quantities corresponding to the bid quantity entry regions may differ from the quantities corresponding to the ask quantity entry regions. While FIG. 1 depicts the quantity entry regions as separate regions, it should be understood that in alternative embodiments the two or more regions may overlap, or two or more regions may be combined into a single region. In yet another embodiment, the regions may be color-coded. For example, the regions may be color-coded to distinguish ask regions from bid regions, or to otherwise differentiate the regions.

In other alternate embodiments the orientation of the trading screen may be altered. For example, the regions may be changed from a vertical orientation, as shown in FIG. 1, to a horizontal orientation. Of course, other orientations are also possible and the preferred embodiments are not limited to any particular orientation. Other embodiments may optionally omit some of the regions shown in FIG. 1. For example, one or both of the quantity columns 102, 104 may be omitted from the trading screen display. In another example, while quantities or other information may be displayed in relation to a static axis of prices, it is not necessary that the static axis of prices be displayed on the trading screen. Thus, the price column 100 may be omitted from the display. Other embodiments may display regions or columns in addition to those depicted in FIG. 1. For example, the trading screen may display one or more working order regions, which may be used to display outstanding, but unfilled, orders submitted by the trader.

The trading screen may be configurable by the trader. For example, the trading screen may be programmed for a default configuration. The default configuration may be specified by a developer of the trading application, but it may also be modified by the trader. Upon opening and running the trading application, the trading application may use the default configuration for the trading screen. The configuration of the trading screen, however, may then be modified by the trader.

For example, the trader may reconfigure the number of bid quantity entry regions or the number of ask quantity entry regions. In another example, the trader may reconfigure the quantities corresponding to one or more of the quantity entry regions. In yet another example, the trader may rearrange the position of the quantity entry regions or of other regions in the trading screen. Additionally, the trader may configure the trading screen to display additional regions, or the trader may remove regions from the trading screen display.

In one preferred embodiment, the trader may make modifications to bid quantity entry region, and the trading application may automatically make the changes to a corresponding ask quantity entry region. In another preferred embodiment, the trader may make changes to an ask quantity entry region, and the trading application may automatically make the change to a corresponding bid quantity entry region. In yet another preferred embodiment, changes made with respect to the bid quantity entry regions are not made with respect to the ask quantity entry regions and vice versa. Other modifications may also be made.

The ask quantity entry regions 106, 108, 110, 112 may be used by a trader to specify quantities for orders and also to place orders. In one preferred embodiment, the trader may specify a quantity for an order by selecting a bid or ask quantity entry region location or cell at a particular price level, for example by using a mouse or other input device to select the cell. By selecting one of the ask quantity entry regions 106, 108, 110, 112 the trader may place a sell order, and by selecting one of the bid quantity entry regions 118, 120, 122, 124 the trader may place a buy order. The quantity of the order would be the quantity corresponding to the particular quantity entry region selected by the trader, while the price level would correspond to the price level of the cell selected by the trader. In an alternative embodiment, a trader can override the quantity corresponding to the particular quantity entry region and directly enter a quantity into a cell. In that event, the entered quantity can be used for the quantity of an order placed by selecting that cell. After receiving the trader's selection, the trading application may automatically place the order.

In another preferred embodiment, the trader may specify an order quantity by selecting a cell in one of the quantity entry regions 106, 108, 110, 112, 118, 120, 122, 124. Instead of automatically placing the order, the trading application may wait for an additional action from the trader before placing the order. For example, the trader may then place the order by subsequently clicking on a cell in the ask quantity region 102 for a sell order, or by clicking on a cell in the bid quantity region 104 for a buy order. In another example, the trader may submit the order by clicking a designated "submit" button displayed on the trading screen. These are merely examples, and many other ways also exist for the trader to confirm the order. Once the trader selects the submit option for the order, the trading application may then send the order message.

In another preferred embodiment, the trader may sum order quantities by selecting more than one of the quantity entry regions. This may allow the trader to place an order for a quantity that does not exactly correspond to one of the quantity entry regions. As the trader sums quantities using the quantity entry regions, the NTQ regions may be used to display the current total quantity selected by the trader. For example, as the trader selected quantity entry regions, the value in the NTQ region may be updated to reflect the sum of the regions selected by the trader.

In another preferred embodiment, the trader may specify a quantity by typing the quantity into one of the quantity entry regions. The quantity entered by the trader may then be added to the quantity value in the corresponding NTQ region. In another embodiment, the trader may type a new quantity directly into the NTQ region.

In yet another preferred embodiment, the trader may remove a quantity from a seed NTQ value by selecting one of the quantity entry regions. For example, the trader may use a left mouse button to select quantity entry regions in order to add the quantities to an NTQ value. The trader may use a right mouse button to select quantity entry regions in order to remove quantities from the NTQ value. Of course, the left and right mouse buttons are merely example, and may other ways may also be used to differentiate a quantity entry region selection that adds the region's quantity to an NTQ value and a quantity entry regions selection that subtracts the region's quantity from an NTQ value.

Figure 2:
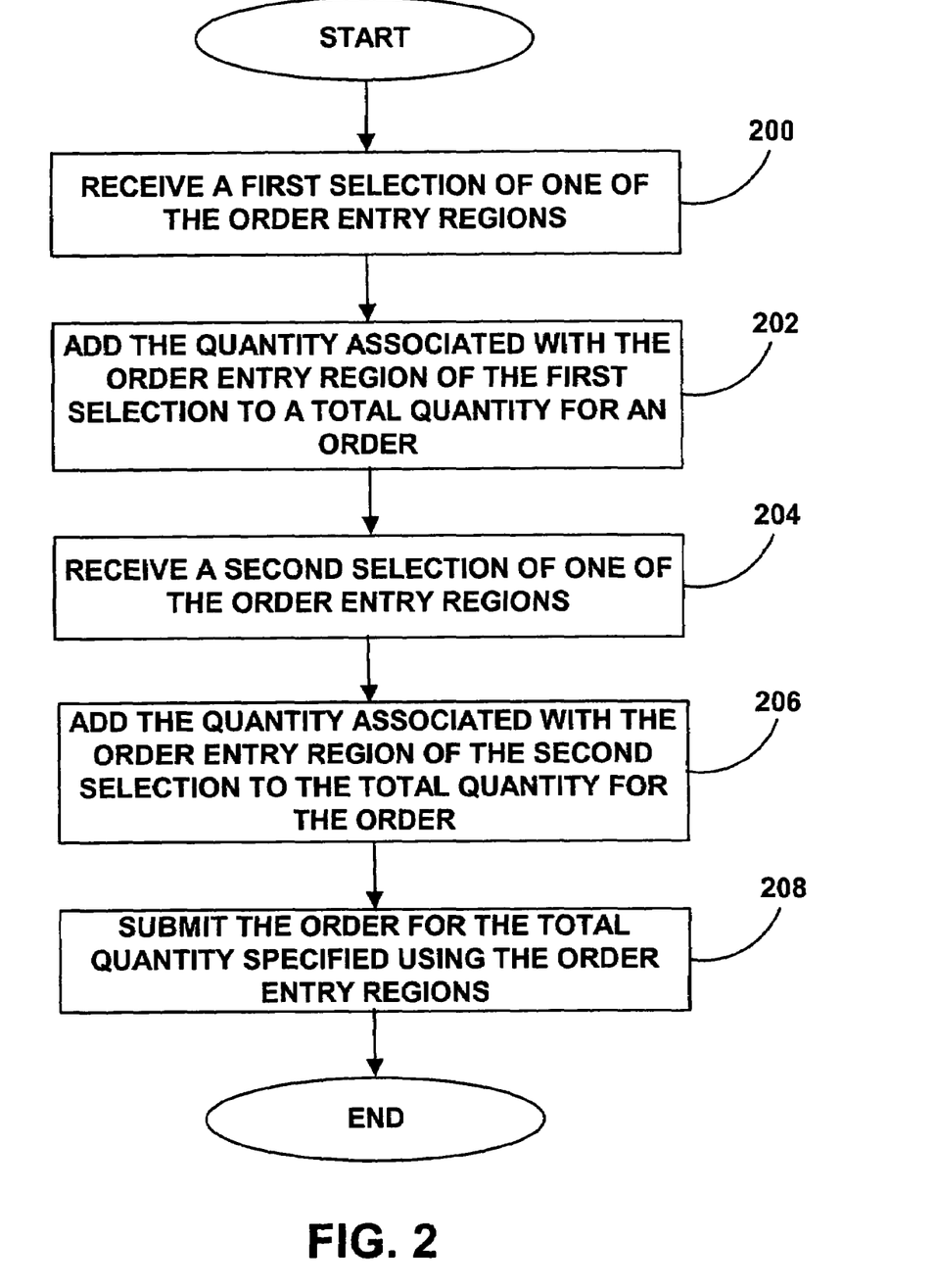
FIG. 2 is a flowchart of a preferred embodiment for order entry using quantity columns that may be used with the trading screen of FIG. 1.

FIG. 2 is a flowchart of a preferred embodiment for order entry using quantity regions that may be used with the trading screen of FIG. 1. At Step 200, the trading application receives a first selection of one of the locations in one of the quantity entry regions at a particular price level. For example, a trader may select one of the locations (e.g., cells) in one of the quantity entry regions by using a mouse or other device to click on one of the locations. Then, at Step 202, the trading application adds the quantity associated with the order region of the first selection to a total quantity for an order at the corresponding price level. Thus, the trading application adds the quantity of the selected quantity entry region to the total quantity for a subsequent order at the corresponding price level. As previously discussed, in response to the selected quantity, the trading screen may also update the value displayed in the corresponding location of the NTQ regions.

Next, at Step 204, the trading application receives a second selection of one of the locations in one of the quantity entry regions associated with the same price level. Again, the trader may select the location in the quantity entry region using a mouse or other device, such as by clicking on the location. The quantity entry region indicated by the second selection may be the same or different than the quantity entry region indicated by the first selection. Thus, the trader may select a region that was different from the first selected region, or the trader may select the same region twice. In response to the second selection, the trading application then adds the quantity associated with the order region of the second selection to the total quantity of a subsequent order, as shown at Step 206. Thus, the total quantity for the subsequent order was first increased by the quantity of the quantity entry region of the first selection and is now increased by the quantity of the quantity entry region of the second selection. The quantity value displayed in the corresponding NTQ region at the particular price level may also be updated to include the new quantity.

Then, at Step 208, the trading application submits an order at the particular price level for the total quantity specified using the quantity entry regions. The order can be submitted in response to a command from the trader. For example, the trader may use a mouse to click on the location of the NTQ region associated with the particular price level. Thus, the trading application submits the order to an exchange, and the quantity for the order includes the quantities of the quantity entry regions for the two selections. If the total quantity for the order was zero before the two selections, then the total quantity for the order is simply the sum of the quantities for the two selected quantity entry regions. If, however, the total quantity for the order was not zero before the two selections, such as if the trader has previously selected other quantity entry regions, then the total quantity would be the previously specified quantity plus the quantities for the two selected quantity entry regions.

Of course, many different variations may be made to the flowchart depicted in FIG. 2. In alternate variations, one or more steps may be omitted. For example, the trading application may only receive one selection before submitting the order, thereby eliminating Steps 204 and 206. In this case, the total quantity submitted for the order would then only be the quantity for the quantity entry region of the first selection. If, however, the trader had made previous quantity entry region selections, then the total quantity would be the sum of those selections in addition to the quantity of the order region specified in Step 200. In another example, the NTQ region may be seeded by other input means than the ask or bid quantity entry regions, such as through use of a keyboard or buttons on an input device such as a mouse or gamepad.

In other alternate variations, one or more steps may be added. For example, the trading application may receive more than two selections from the trader, thereby receiving indications other than the ones depicted in Steps 200 and 204. In this case, the total order quantity would then include the quantities of the quantity entry regions specified in Steps 200 and 204, and it would also include the quantities of the other specified quantity entry regions. Thus, the flowchart of FIG. 2 may be executed in a repeating loop, depending on the number of selections made by the trader. In another example, the trading application may receive an indication from the trader to place the order prior to submitting the order as depicted in Step 208. This may allow the trader to make a variable number of quantity entry region selections prior to instructing the trading application to place the order.

Figure 3A:
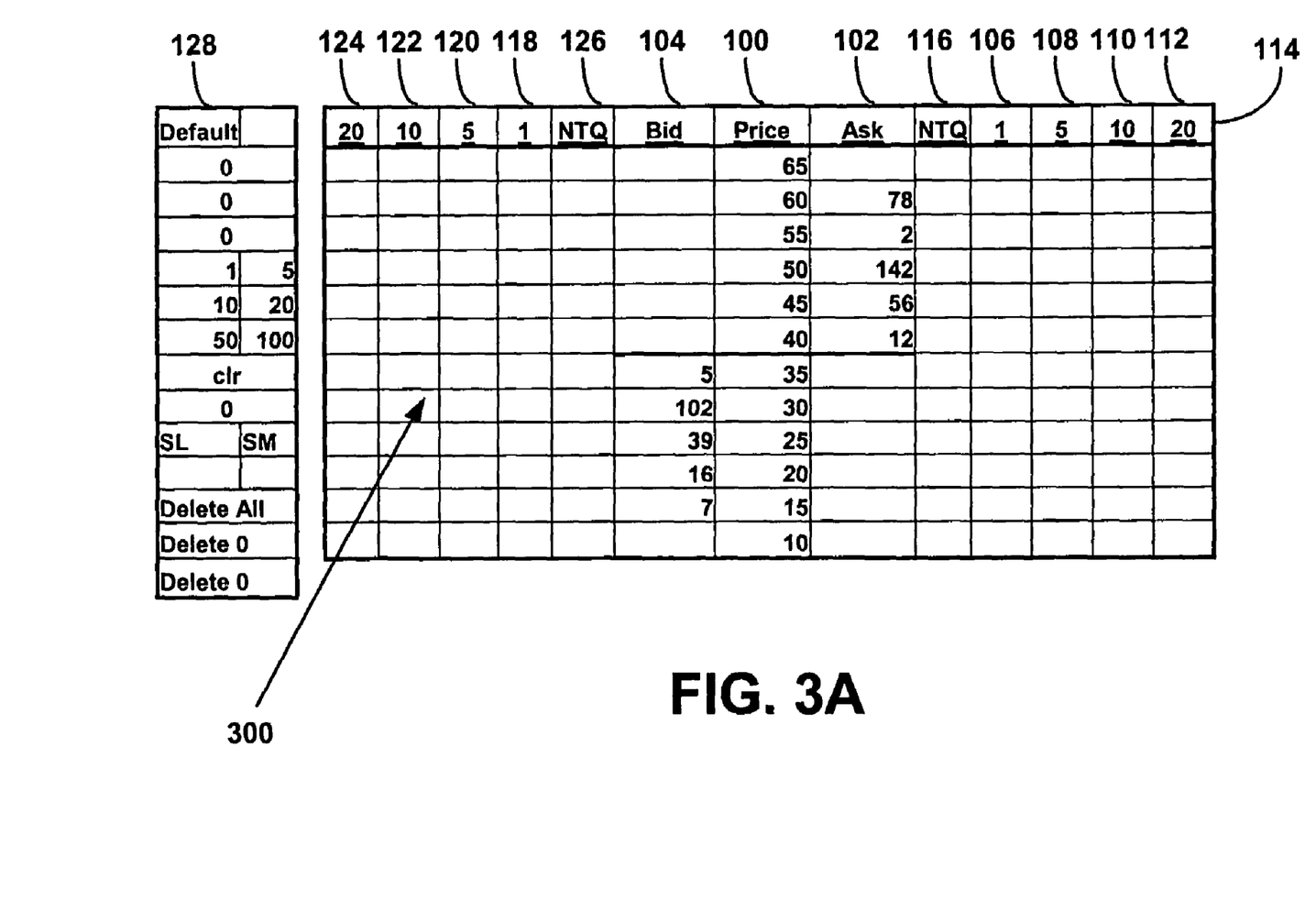
FIGS. 3A-3F depict a preferred operation of a next traded quantity feature in the trading screen of FIG. 1.
Figure 3B:
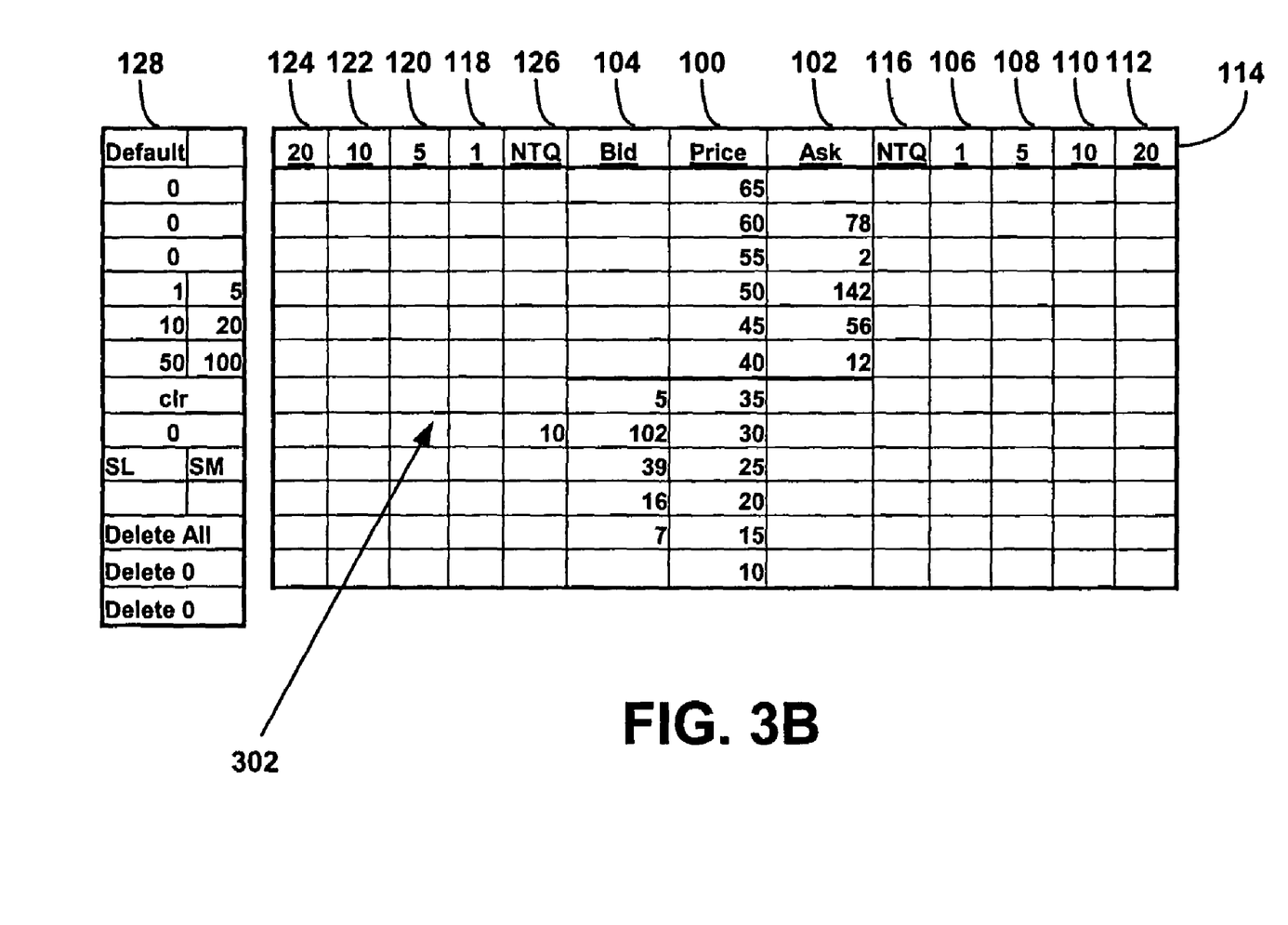

FIGS. 3A-3F depict an example operation of a next traded quantity feature in the trading screen of FIG. 1. FIG. 3A depicts the trading screen in an initial state prior to placing an order. For example, the trader may want to enter an order to buy 17@30. This would be an order to buy a quantity of 17 at the 30 price level. To place the order, the trader may first select the cell in the third bid quantity entry column 122 that corresponds to the 30 price level, which is indicated by arrow 300. As the third bid quantity entry column 122 corresponds to a quantity of 10, selecting this cell specifies a quantity of ten for the order. Once the trader selects the quantity of ten, the bid NTQ column 104 may be updated to show a total quantity of ten at the 30 price level, as shown in FIG. 3B.

Figure 3C:
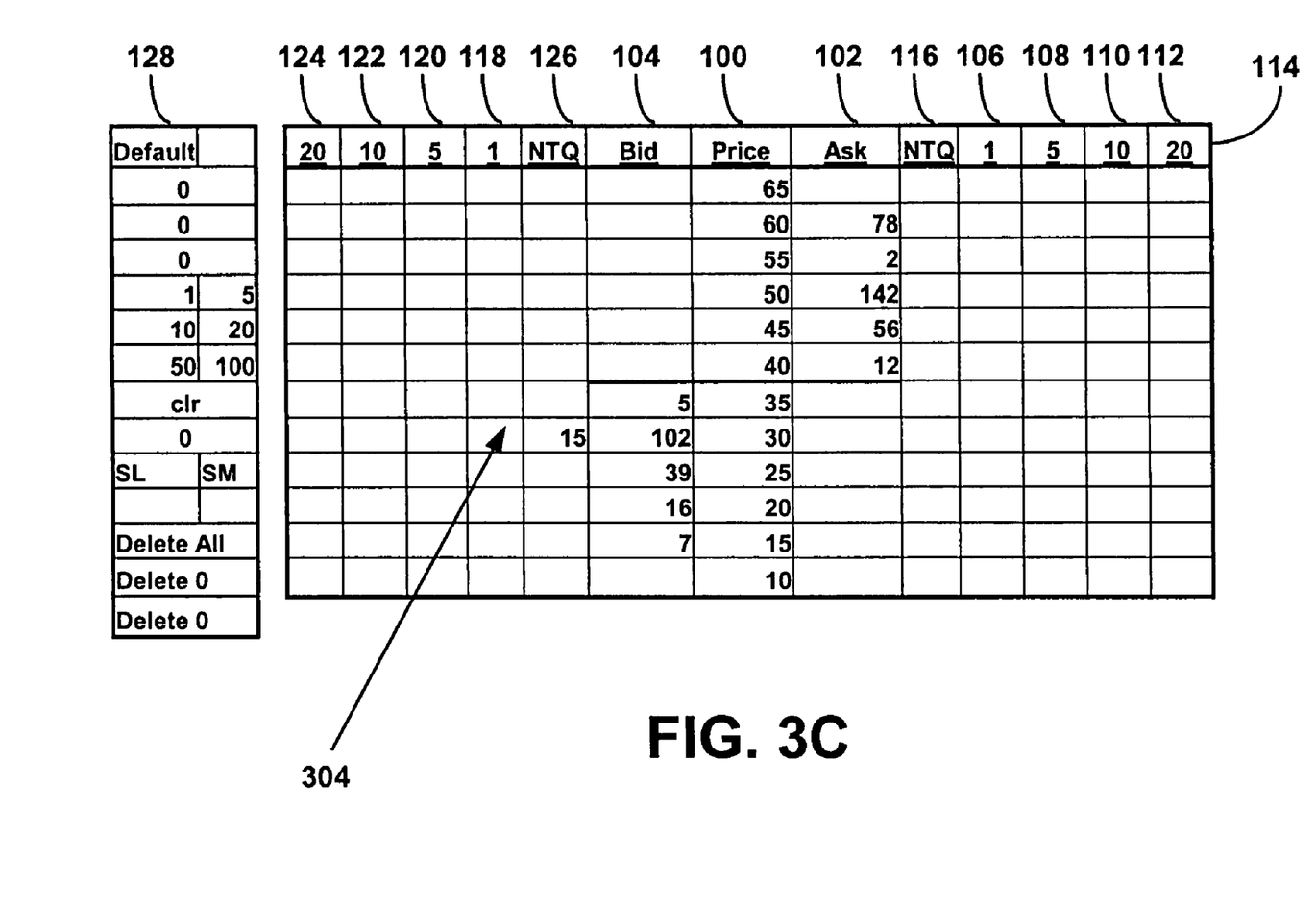

Next, the trader may also select the cell in the second bid quantity entry column 120 that corresponds to the 30 price level, which is depicted by arrow 302. Since this column corresponds to a quantity of 5, selecting this cell specifies a quantity of 5 in addition to the previously selected quantity of 10 for this order. By selecting an additional quantity of 5, the trader has now selected a total quantity of 15. The bid NTQ column 126 is updated to reflect the total quantity of 15, as shown in FIG. 3C.

Figure 3D:
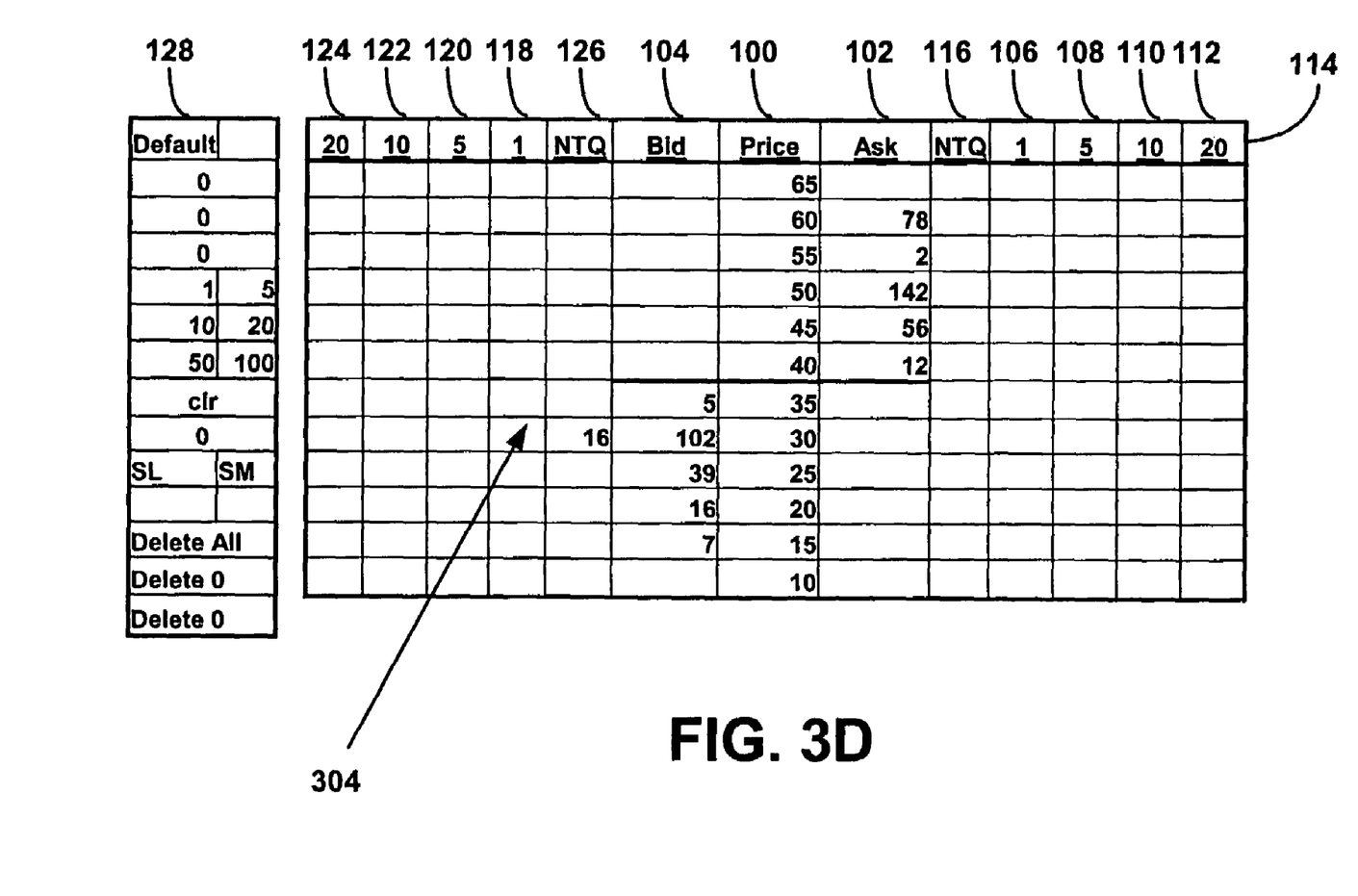
Figure 3E:
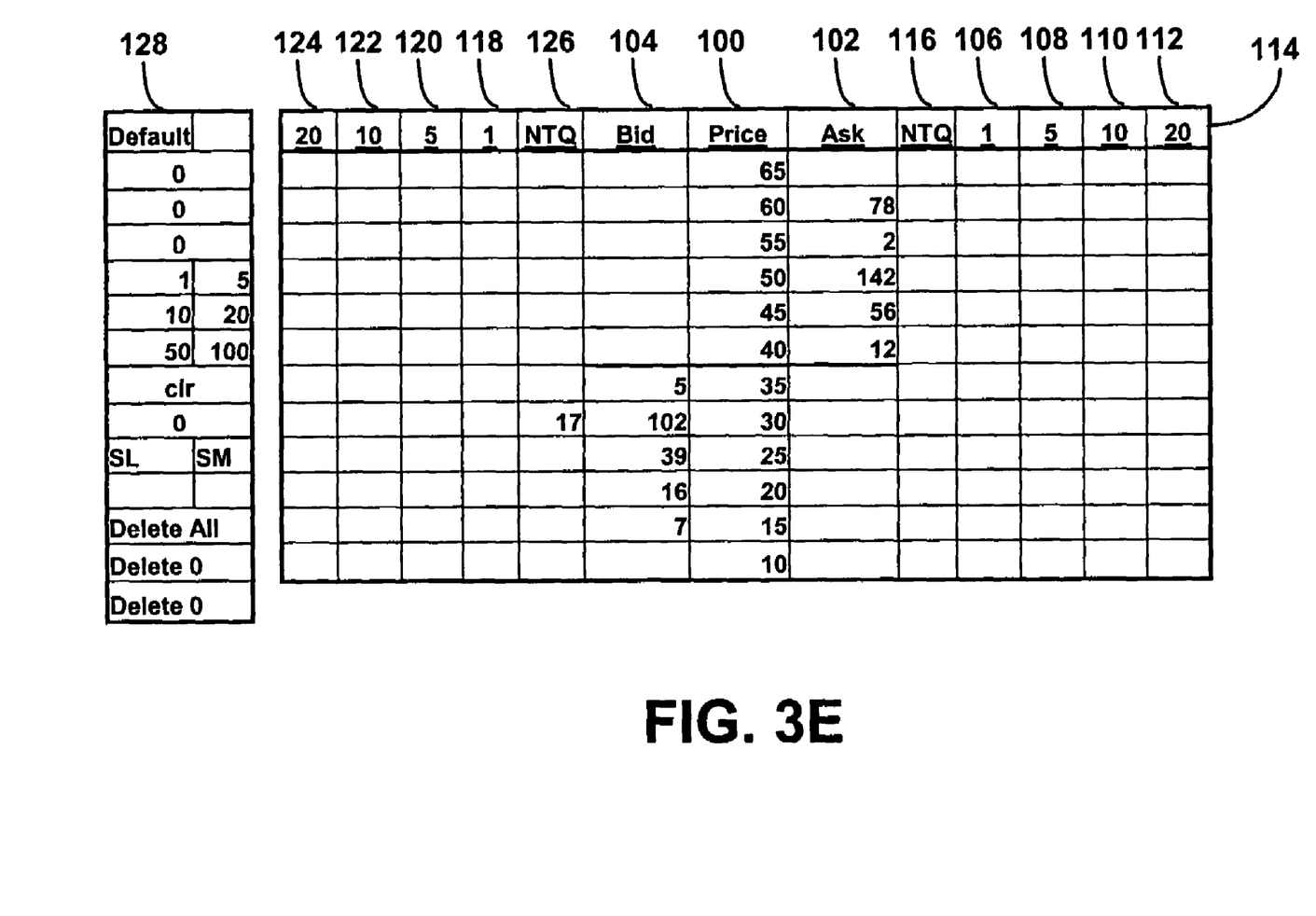

The trader continues to specify the quantity by selecting the cell in the first bid quantity entry column 118 that corresponds to the 30 price level, which is depicted by arrow 304. By selecting this cell, the trader adds an additional quantity of one the previously specified quantity of 15. The bid NTQ column 126 is updated to reflect the total quantity of 16, as shown in FIG. 3D. Again, the trader selects the cell in the first bid quantity entry column 118 that corresponds to the 30 price level to add an additional quantity of one to the total quantity. The trader's selections specify a total quantity of 17 at the 30 price level, which is reflected in the bid NTQ column 126 as shown in FIG. 3E. It should also be noted, that an embodiment of the invention would also allow the trader to enter a quantity (such as 17) directly into a location in the NTQ region.

Once the trader has finished selecting the bid quantity entry columns 118, 120, 122, 124 to select a quantity for the order, the trader may then place the order. This may be done, for example, by providing the trading application with an indication to place the order. In one embodiment, the trader may place the order by clicking on the cell in the bid NTQ column 126 at the 30 price level. In another embodiment, the trader may place the order by clicking on the cell in the bid quantity column 104 at the 30 price level. Of course, other ways also exist for the trader to prompt the trading application to place the order, and these may also be used.

Figure 3F:
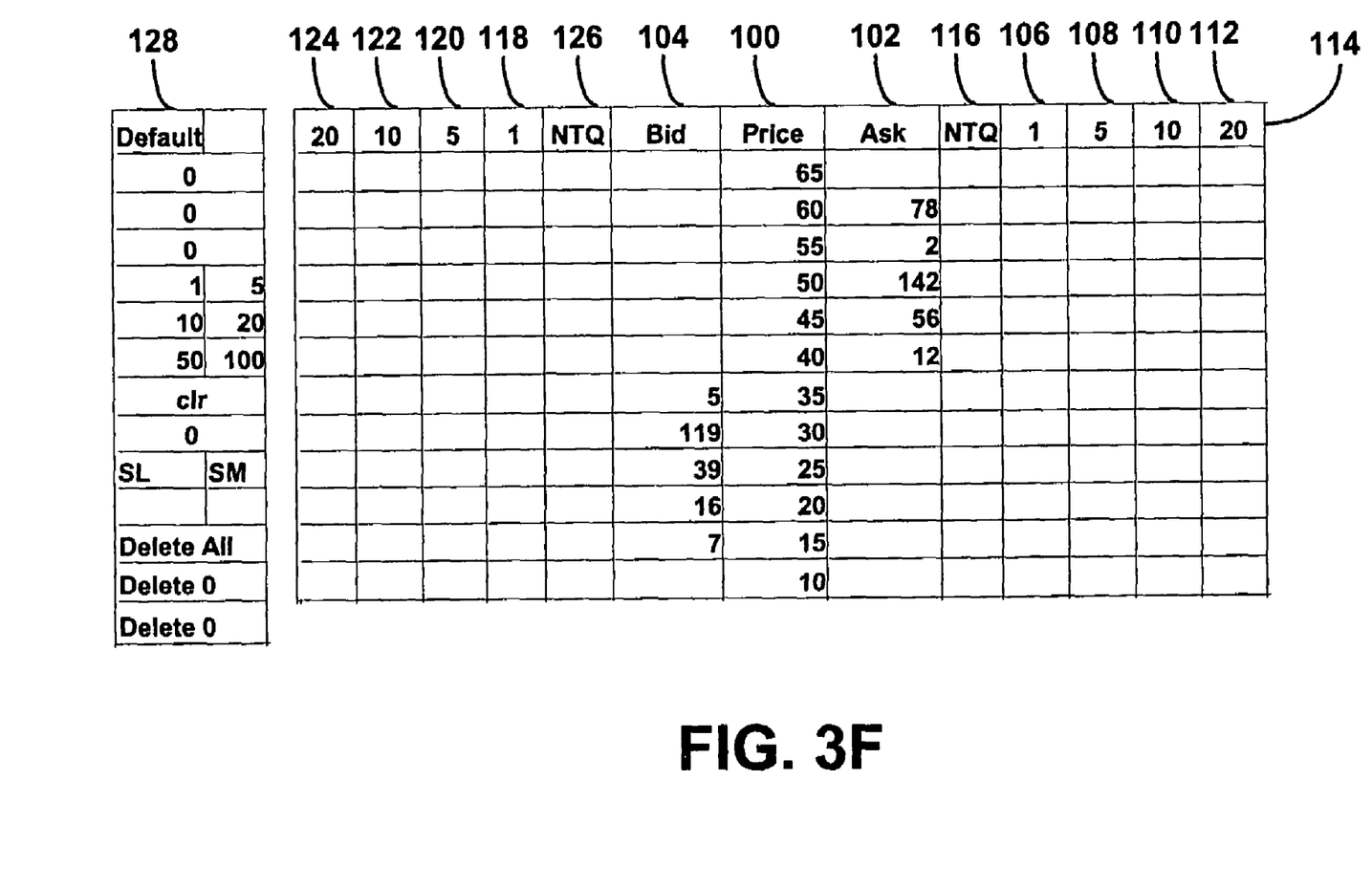

After placing the order, the trading application may remove the previously specified NTQ quantity of 17 from the bid NTQ column 126, as shown in FIG. 3F. Thus, the trader may begin again to specify another quantity at the 30 price level. In an alternate embodiment, the trading application may retain the 17 quantity at that price level, thereby allow the trader to quickly submit another order having that quantity. Of course, the trading application may allow the trader to easily clear that retained quantity in order for the trader to specify a new quantity. In a preferred embodiment, the screen shown in FIGS. 3A-3F could also include at least one working order region. In this example, an indicator representing the order for a quantity of 17 at the 30 price level would be displayed in a location in the working order region (e.g., a cell) corresponding to the 30 price level.

Also in response to the order, the outstanding bid quantity at the 30 price level may be increased from "102" to "119" to reflect the additional quantity of 17 submitted by the trader. This increase, however, is not directly performed by the trading application, but rather it is in response to updated information received from the exchange. In placing the order, the trading application submits to the exchange the additional quantity of 17 at this price level. The exchange responsively increases the quantity at this level by 17. Then, assuming there are no other quantity changes at this level, the exchange then provides to the trading application through the normal market update process the updated quantity information for this price level, thereby causing the trading application to updates its quantity at this level from "102" to "119."

It should be understood, however, that many variations may be made to the process previously described for specifying an order quantity. For example, the selections of the bid quantity entry columns 118, 120, 122, 124 may be made in any order. In another example, different bid quantity entry columns 118, 120, 122, 124 may be used depending on the quantities corresponding to the bid quantity entry columns 118, 120, 122, 124. Of course, the trader may also place orders at different price levels and for different quantities, and the trader may also place sell orders.

In specifying order quantities in this manner, it is not necessary that the trader specifies a complete order quantity at one price level and places the order before proceeding to specify a quantity at another price level. The trader may, for example, interleave making quantity entry column selections for two or more orders. This may allow the trader, for example, to specify NTQ values at various different price levels without actually placing the orders at those price levels. Thus, the quantities may be seeded at various different price levels, thereby allowing the trader to even more quickly place orders for different quantities in rapid succession. In one embodiment, the trader may drag and drop an NTQ value from one price level into another price level, and the trader may drag and drop the NTQ value from the buy NTQ column 126 to the ask NTQ column 116 and vice versa. This may also allow the trader to more quickly specify a quantity for trades that is different from the default quantity.

In one preferred embodiment, the trader may select cells in the quantity entry columns 106, 108, 110, 112, 118, 120, 122, 124 using a mouse or other input device. The mouse, or other device, may have multiple buttons, which can be configured to perform different functions. For example, a first button may be configured to add quantities to an order, while a second button may be configured to submit an order. Thus, the trader may use the first button to select one or more cell in the quantity entry columns 106, 108, 110, 112, 118, 120, 122, 124. By selecting ask or bid quantity entry columns at the same price level using the first button, the trader may sum quantities for an order at that price level. As previously described, the total summed quantity may be displayed in one of the NTQ columns 116, 126 at the order's price level.

In one embodiment, the trader may submit an order using the second button by placing the mouse's pointer in the NTQ or quantity column for a price level and clicking the second button. The trading application may then submit the order using the quantity specified in the NTQ column, thereby potentially submitting a summed quantity value for the order. When the trader places the pointer over a cell in one of the quantity entry columns for that price level and clicks the second button, the trading application may also place an order using the quantities indicated by the NTQ column. In an alternate embodiment, when the trader places the pointer over a cell in one of the quantity entry columns for that price level and clicks the second button, then the trading application may submit an order at that price level having a quantity corresponding to the quantity for that quantity entry column. Thus, the trading application places an order but does not sum previously selected quantities.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method of displaying market information and receiving trade orders relating to a tradeable object being traded on an electronic exchange using a graphical user interface and a user input device, the method comprising:

dynamically displaying a first indicator in relation with a first price level on a common static price axis, the first indicator associated with a highest bid price available in the market for the tradeable object;

dynamically displaying a second indicator in relation with a second price level on the common static price axis, the second indicator associated with a lowest ask price available in the market for the tradeable object;

displaying a first quantity entry region aligned with the common static price axis, the first quantity entry region comprising a first plurality of locations, each location in the first quantity entry region corresponding to a different price level of the common static price axis and further corresponding to a first preset order quantity;

displaying a second quantity entry region aligned with the common static price axis, the second quantity entry region comprising a second plurality of locations, each location in the second quantity entry region corresponding to a different price level of the common static price axis and further corresponding to a second preset order quantity, wherein the first preset order quantity and the second preset order quantity are different;

upon selecting a first location in the first quantity entry region corresponding to a third price level on the common static price axis, setting at a computer device a first next quantity for an order to be sent to the electronic exchange at the third price level to the first preset order quantity;

upon selecting a second location in the second quantity entry region corresponding to the third price level, setting at a computer device a second next quantity for the order to be sent to the electronic exchange at the third price level to a sum of the first preset order quantity and the second preset order quantity; and sending the order having the third price level and the second next quantity to the electronic exchange;

wherein upon selecting a third location in the first quantity entry region corresponding to a fourth price level on the common static price axis, the first next quantity for an order to be sent to the electronic exchange at the fourth price level is set at a computer device to the first preset order quantity, and upon selecting a fourth location in the second quantity entry region corresponding to the fourth price level, the second next quantity for the order to be sent to the electronic exchange at the fourth price level is set at a computer device to the sum of the first preset order quantity and the second preset order quantity, wherein the first and second indicators can move relative to the common static price axis when the market changes for the tradeable object.

2. The method of claim 1, further comprising:
establishing by a user the first preset order quantity; and
establishing by the user the second preset order quantity.

3. The method of claim 1, further comprising:
displaying a first indicator associated with the first preset order quantity in the first quantity entry region; and
displaying a second indicator associated with the second preset order quantity in the second quantity entry region.

4. The method of claim 1, further comprising:
displaying a next quantity entry region comprising a third plurality of locations, each location in the next quantity entry region corresponding to a price level of the common static price axis and further corresponding to a next quantity for use in relation to an order to be sent to the electronic exchange at each price level.

5. The method of claim 4, wherein the order at the third price level is sent upon selecting a location corresponding to the third price level in the next quantity entry region, the method further comprising sending the order having the second next quantity and the fourth price level, wherein the order at the fourth price level is sent upon selecting a location corresponding to the fourth price level in the next quantity entry region.

6. The method of claim 5, wherein selecting the location comprises an action of a user input device with a pointer positioned over the location.

7. The method of claim 4, further comprising:
displaying a first indicator associated with the next quantity corresponding to each location of the third plurality of locations.

8. The method of claim 7, wherein the first location in the first quantity entry region is associated with the first next quantity, and wherein upon selecting the first location in the first quantity entry region, the first indicator in the next quantity entry region displays the first next quantity.

9. The method of claim 8, further comprising:
upon selecting the second location in the second quantity entry region, the first indicator in the next quantity entry region displays the second next quantity.

10. The method of claim 1, wherein the first and second quantity entry regions are associated with quantities to buy the tradeable object.

11. The method of claim 1, wherein the first and second quantity entry regions are associated with quantities to sell the tradeable object.

12. The method of claim 1, further comprising:
displaying a third quantity entry region comprising a third plurality of locations, each location in the third quantity entry region corresponding to a price level of the common static price axis and further corresponding to a third preset order quantity; and
displaying a fourth quantity entry region comprising a fourth plurality of locations, each location in the fourth quantity entry region corresponding to a price level of the common static price axis and further corresponding to a fourth preset order quantity.

13. The method of claim 12, wherein the first and second quantity entry regions are associated with quantities to buy the tradeable object, and wherein the third and fourth quantity entry regions are associated with quantities to sell the tradeable object.

14. The method of claim 13, wherein the first and second quantity entry regions are associated with quantities to sell the tradeable object, and wherein the third and fourth quantity entry regions are associated with quantities to buy the tradeable object.

15. The method of claim 1, wherein the third price level is the first price level, and wherein the order is sent upon selecting a location corresponding to the first indicator.

16. The method of claim 1, wherein the third price level is the second price level, and wherein the order is sent upon selecting a location corresponding to the second indicator.

17. The method of claim 1, wherein selecting the second location in the second quantity entry region with a first command type sets the second next quantity to the sum of the first preset order quantity and the second preset order quantity.

18. The method of claim 17, wherein selecting the second location in the second quantity entry region with a second command type sets the second next quantity to a difference between the first preset order quantity and the second preset order quantity.

19. The method of claim 1, further comprising:
displaying price levels along the common static price axis.

20. The method of claim 1, further comprising:
displaying a bid display region comprising a plurality of locations, each location associated with a price level along the common static price axis, the bid display region for dynamically displaying a plurality of indicators associated with orders to buy the tradeable object.

21. The method of claim 20, wherein the first indicator is displayed in the bid display region.

22. The method of claim 1, further comprising:
displaying an ask display region comprising a plurality of locations, each location associated with a price level along the common static price axis, the ask display region for dynamically displaying a plurality of indicators associated with orders to sell the tradeable object.

23. The method of claim 22, wherein the second indicator is displayed in the ask display region.

* * * * *